(12) United States Patent
Elmali et al.

(10) Patent No.: US 12,082,059 B2
(45) Date of Patent: Sep. 3, 2024

(54) COORDINATED MRO FOR PSCell CHANGE FAILURE

(71) Applicant: NOKIA SOLUTIONS AND NETWORKS OY, Espoo (FI)

(72) Inventors: Ugur Baran Elmali, Munich (DE); Krzysztof Kordybach, Wroclaw (PL); Guillaume Decarreau, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/092,016

(22) Filed: Dec. 30, 2022

(65) Prior Publication Data

US 2023/0217326 A1 Jul. 6, 2023

(30) Foreign Application Priority Data

Jan. 5, 2022 (FI) ...................... 20225005

(51) Int. Cl.
*H04W 36/00* (2009.01)
*H04W 36/08* (2009.01)

(52) U.S. Cl.
CPC . *H04W 36/0079* (2018.08); *H04W 36/00837* (2018.08); *H04W 36/08* (2013.01)

(58) Field of Classification Search
CPC ....... H04W 36/0079; H04W 36/00837; H04W 36/08; H04W 36/0069; H04W 36/00692; H04W 36/00695; H04W 36/00698; H04W 36/008375; H04W 36/00838;

(Continued)

(56) References Cited

U.S. PATENT DOCUMENTS

2023/0109338 A1* 4/2023 Ma .................... H04W 36/0079
370/331

FOREIGN PATENT DOCUMENTS

| WO | 2018/203710 A1 | 11/2018 | |
| WO | WO-2021066515 A1 * | 4/2021 | ........ H04W 36/0058 |
| WO | 2021/150014 A1 | 7/2021 | |

OTHER PUBLICATIONS

Qualcomm Inc. ("MRO for SN change failure", 3GPP TSG-RAN WG3 Meeting #114e, R3-214916, Nov. 1-Nov. 11, 2021) (Year: 2021).*

(Continued)

*Primary Examiner* — Chi H Pham
*Assistant Examiner* — Ji-Hae Yea
(74) *Attorney, Agent, or Firm* — SQUIRE PATTON BOGGS (US) LLP

(57) ABSTRACT

Example embodiments of the present disclosure relate to devices, methods, apparatuses and computer readable storage media for a primary secondary cell (PSCell) change failure. In example embodiments, a master network device receives, from a source secondary network device, a first request for a change of a terminal device from the source secondary network device to a target secondary network device. The master network device receives, from the source secondary network device, an identification of a source PSCell operated by the source secondary network device and serving the terminal device prior to the first request. The master network device further receives, from the terminal device, an indication of a radio link failure of the terminal device in a PSCell and transmits the indication of the radio link failure to the source secondary network device along with the identification of the source PSCell.

11 Claims, 6 Drawing Sheets

(58) Field of Classification Search
CPC ............ H04W 36/083; H04W 36/085; H04W 36/087; H04W 36/13; H04W 36/305; H04W 36/38
See application file for complete search history.

(56) References Cited

OTHER PUBLICATIONS

Office Action dated Mar. 29, 2022 corresponding to Finnish Patent Application No. 20225005.
Finnish Search Report dated Mar. 29, 2022 corresponding to Finnish Patent Application No. 20225005.
Communication of Acceptance—section 29 a of Patents Decree dated Sep. 20, 2022 corresponding to Finnish Application No. 20225005.
Huawei, "(TP for SON BLCR for 38.423, 38.300) MRO for SN Change Failure," R3-214958, 3GPP TSG-RAN WG3 Meeting #114-e, E-meeting, Nov. 1-11, 2021.
3GPP TS 37.340 V16.8.0 (Dec. 2021), Technical Specification, 3rd Generation Partnership Project; Technical Specification Group Radio Access Network; Evolved Universal Terrestrial Radio Access (E-UTRA) and NR; Multi-connectivity; Stage 2 (Release 16), Dec. 23, 2021.

* cited by examiner ved to specify data collection enhancements in Release
COORDINATED MRO FOR PSCell CHANGE FAILURE

CROSS REFERENCE TO RELATED APPLICATION

This application claims the benefit of Finnish Patent Application No. 20225005, filed Jan. 5, 2022. The entire content of the above-referenced application is hereby incorporated by reference.

FIELD

Example embodiments of the present disclosure generally relate to the field of communications, and in particular, to devices, methods, apparatuses and computer readable storage media for a primary secondary cell (PSCell) change failure.

BACKGROUND

In 3rd Generation Partnership Project (3GPP), it is approved to specify data collection enhancements in Release 17 (Rel-17) New Radio (NR) for Self-organizing Networks (SON)/Minimization of Drive Tests (MDT). The objectives of Rel-17 SON/MDT work include the support of data collection for SON features, involving coverage and capacity optimization, inter-system inter-radio access technology (inter-RAT) energy saving, inter-system load balancing, 2-step Random Access Channel (RACH) optimization and mobility enhancement optimization. Rel-17 SON/MDT work is also required to study the leftovers of Release 16 (Rel-16) SON/MDT that include physical cell identify (PCI) selection, successful handover reports, user equipment (UE) history information in E-UTRA NR Dual Connectivity (EN-DC), load balancing enhancement, RACH optimization and mobility robustness optimization (MRO) for a secondary node (SN) change failure.

In the scenario of Dual Connectivity (DC), a Master Node (MN) functions as a controlling entity that provides control plane connection to a core network and utilizes an SN for additional resources to the UE. Secondary Cell Group (SCG) refers to a group of serving cells associated with the SN and comprises a PSCell that is a primary cell of the SCG. For MRO, when a PSCell change failure occurs, if the failure is a result of an SN-initiated PSCell change, the SN initiating the last PSCell change is responsible to derive the needed correction for its SCG mobility configuration. The MN may perform an initial analysis to identify the node that caused the failure. The node that caused the failure performs root cause analysis.

SUMMARY

In general, example embodiments of the present disclosure provide devices, methods, apparatuses and computer readable storage media for a PSCell change failure.

In a first aspect, a master network device is provided which comprises at least one processor and at least one memory including computer program code. The at least one memory and the computer program code are configured to, with the at least one processor, cause the master network device to receive, from a source secondary network device, a first request for a change of a terminal device from the source secondary network device to a target secondary network device. The first request comprises an identification of a source primary secondary cell operated by the source secondary network device and serving the terminal device prior to the first request. The master network device is further caused to receive, from the terminal device, an indication of a radio link failure of the terminal device in a primary secondary cell, and to transmit, to the source secondary network device, the indication of the radio link failure, and the identification of the source primary secondary cell as received from the source secondary network device and stored by the master network device.

In a second aspect, a source secondary network device is provided which comprises at least one processor and at least one memory including computer program code. The at least one memory and the computer program code are configured to, with the at least one processor, cause the source secondary network device to transmit, to a master network device, a first request for a change of a terminal device from the source secondary network device to a target secondary network device. The first request comprises an identification of a source primary secondary cell operated by the source secondary network device and serving the terminal device prior to the first request. The source secondary device is further caused to receive, from the master network device, an indication of a radio link failure of the terminal device in a primary secondary cell, and the identification of the source primary secondary cell as transmitted to the master network device and stored by the master network device.

In a third aspect, a method is provided. In the method, a master network device receives, from a source secondary network device, a first request for a change of a terminal device from the source secondary network device to a target secondary network device. The first request comprises an identification of a source primary secondary cell operated by the source secondary network device and serving the terminal device prior to the first request. The master network device further receives, from the terminal device, an indication of a radio link failure of the terminal device in a primary secondary cell, and transmits, to the source secondary network device, the indication of the radio link failure, and the identification of the source primary secondary cell as received from the source secondary network device and stored by the master network device.

In a fourth aspect, a method is provided. In the method, a source secondary network device transmits, to a master network device, a first request for a change of a terminal device from the source secondary network device to a target secondary network device. The first request comprises an identification of a source primary secondary cell operated by the source secondary network device and serving the terminal device prior to the first request. The source secondary device further receives, from the master network device, an indication of a radio link failure of the terminal device in a primary secondary cell, and the identification of the source primary secondary cell as transmitted to the master network device and stored by the master network device.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
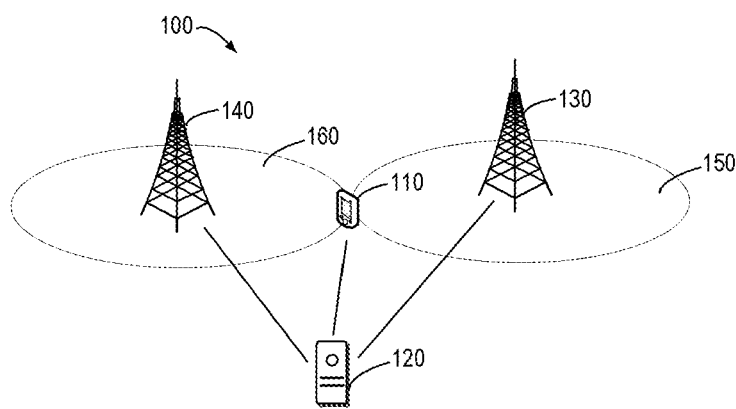
FIG. 1 illustrates an example environment in which example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "master network device" refers to a network device in support of Dual Connectivity (DC) of a terminal device which functions as a controlling entity providing control plane connection to a core network and utilizes a secondary network device for additional resources to the terminal device. As used herein, the term "secondary network device" refers to a network device in support of DC of a terminal device with a master network device that provides additional resources to the terminal device and is controlled by the master network device. For the purpose of discussion, some example embodiments will be described with reference to a Master Node (MN) as an example of the master network device and with reference to a secondary node (SN) as an example of the secondary network device.

As used herein, the term "cell" refers to a coverage area provided and operated by a network device to serve a terminal device. As used herein, the term "primary secondary cell" or "PSCell" refers to a primary cell of Secondary Cell Group (SCG) that is a group of serving cells associated with a secondary network device.

As used herein, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

As described above, the objectives of 3GPP Rel-17 SON/MDT include mobility robustness optimization (MRO) for an SN change failure. The specification of inter-node information exchange may include possible enhancements to S1/NG, X2/Xn, and F1/E1 interfaces.

In case of Multi-RAT Dual Connectivity (MR-DC), when a UE detects a radio failure in the PSCell (for example, an SCG failure), the UE transmits to an MN an SCG Failure Information message, including an SCG failure type and potential measurement reports that may be configured by the MN and/or the SN. These reports may be then used for MRO, for example, to determine configuration changes to be made in the responsible nodes, among other use cases, such as failure detection and recovery.

For example, in case of a PSCell change failure, if the MN is responsible for SCG mobility, the MN may correct its own configuration with no need of signaling towards the SN. If the SN is responsible for SCG mobility, the MN forwards the SCG Failure Information message to the SN initiating the last PSCell change (or the last serving SN, in case of too late SN change). In case of an SCG failure that is a result of an SN-initiated PSCell change, the SN initiating the last PSCell change (or the last serving SN, in case of too late SN change) is responsible to derive the needed correction for its SCG mobility configuration.

There are three typical PSCell change failure cases, including a too late PSCell change, a too early PSCell change and a PSCell change to a wrong PSCell. In case of a too late PSCell change, an SCG failure occurs after the UE has stayed for a too long period of time in a PSCell, and a suitable different PSCell is found based on the measurements reported from the UE. In case of the too early PSCell change, an SCG failure occurs shortly after a successful PSCell change from a source PSCell to a target PSCell or a PSCell change failure occurs during the PSCell change procedure, and the source PSCell is still the suitable PSCell based on the measurements reported from the UE. In case of a PSCell change to a wrong PSCell, an SCG failure occurs shortly after a successful PSCell change from a source PSCell to a target PSCell or a PSCell change failure occurs during the PSCell change procedure, and a suitable PSCell different with the source PSCell or target PSCell is found based on the measurements reported from the UE.

For example, the MN may perform an initial MRO analysis and conclude three different failure cases after receiving the SCG Failure Information message from the UE. The MN decides which SN the SCG Failure Information message is forwarded to. Then, the MN may forward the SCG Failure Information message to the last serving SN, or the SN initiating the last PSCell change (which is also called a source SN), for the SN to make configuration changes (for example, MRO), after an initial analysis to identify the node that caused the failure. Alternatively, the MN may directly use the SCG Failure Information message and make its own configuration changes, in case the MN is responsible for the SCG mobility and the SCG failure.

Moreover, Rel-17 UEs will report the SCG Failure Information that includes more elements than those in the reports of pre-Rel-17 UEs. Those new IEs to be introduced in the SCG Failure Information message include Cell Global Identity (CGI) of the Source PSCell, CGI of the Failed PSCell, timeSCGFailure (indicating the time elapsed since the last PSCell change initiation until SCG failure), connectionFailureType and random-access related information set by the PSCell. CGI information element used within the 3GPP specifications is as shown below.

```
-- ASN1START
-- TAG-CGI-INFO-LOGGING-START
CGI-Info-Logging-r16 :: =       SEQUENCE {
    plnm-Identity-r16               PLMN-Identity,
    CellIdentity-r16                CellIdentity,
    trackingAreaCode-r16            TrackingAreaCode    OPTIONAL
}
-- TAG-CGI-INFO-LOGGING-STOP
-- ASN1STOP
```

The CGI of the Source PSCell indicates the source PSCell of the last SN change, which may be E-UTRA cell or NR cell. The CGI of the Failed PSCell indicates the PSCell in which SCG failure is detected or the target PSCell of the failed PSCell change, which may be E-UTRA cell or NR cell. The timeSCGFailure indicates the time elapsed since the last PSCell change initiation until SCG failure. The connectionFailureType indicates a radio link failure or SN change failure. However, these new IEs will not be in the report of pre-Rel-17 UEs.

In addition, in Rel-17, it is agreed that if the sufficient time has passed between the SN change and the report of a SCG failure, the source SN may have released the UE context when it receives SCG Failure Information message from the MN via an XnAP message. To assist MRO analysis of pre-Rel-17 UEs, it is further agreed that the Source PSCell CGI and Failed PSCell CGI IEs are included in the XnAP message if available at the MN. Based on this agreement, the MN may include the Source PSCell CGI and Failed PSCell CGI to the newly defined message from the MN to the SN that has initiated the PSCell change.

However, the MN may not always be aware of the PSCell for a given UE. For NR Dual Connectivity (NR-DC), the MN may be able to read a SCG configuration provided by a target SN during the SN change, which would enable the MN to know about the new serving PSCell, but forcing MN to always read the SCG configuration provided by the target SN would be abusive. For EN-DC, the MN may not even be able to read such a SCG configuration.

Consider a scenario where the source SN initiates an SN change for a pre-Rel-17 UE. The UE connects to the target SN, but encounters a radio link failure (RLF) after a short while (so that this is not a too late PSCell change failure). The UE reports SCG Failure Information message to the MN, and the MN makes an initial analysis. In this case, the MN needs to forward the SCG Failure Information message, together with the Source PSCell CGI and the Failed PSCell CGI to the source SN. In case the UE context is still kept in the source SN, there would be no need for the MN to further indicate it to the source SN. However, as discussed above, the source SN may not have the UE context when it receives an SCG Failure Information message. As the source SN and the MN are not aware of the source PSCell CGI, there may be a problem for MRO, since the source PSCell CGI cannot be reported by the MN to the source SN.

In a classic MRO, a concept of the "Mobility Information" is used. For example, the source node may provide the target node with a 32-bit "container" that the target node returns to the source node in case the HO fails. The information within the container is constructed by the source, and this information can include anything that the source would like to include. The encoded information is not read or interpreted by the target. The Mobility Information is used to identify a user or user group rather than a cell. This information may be sent to the MN during SN change, and returned back to the source SN in case of "too early PSCell change failure" or "PSCell change failure to wrong cell". However, there is no mechanism to utilize this information to reflect the source PSCell CGI.

Example embodiments of the present disclosure provide a mechanism to coordinate MRO for a PSCell change failure. With this mechanism, a master network device (such as an MN) receives from a source secondary network device (such as a source SN) a request (referred to as a first request) for a change of a terminal device (such as a UE) from the source secondary network device to a target secondary network device (such as a target SN). The first request will trigger a change of the terminal device from the source secondary network device to the target secondary network device. The master network device receives from the source secondary network device an identification of a source primary secondary cell (such as a source PSCell). The source primary secondary cell is operated by the source secondary network device and serves the terminal device prior to the transmission of the first request from the source secondary network device. After the master network device receives, from the terminal device, an indication of a radio link failure (RLF) of the terminal device in a primary secondary cell, the master network device transmits, to the source secondary network device, the indication of the radio link failure and the identification of the source primary secondary cell. The primary secondary cell may be a target primary secondary cell (such as a target PSCell) operated by the target secondary network device, or the source primary secondary cell operated by the source secondary network device.

As such, during the SN change procedure initiated by a source SN, the source (initiating) SN indicates the identification of the source PSCell (such as the source PSCell CGI) to the MN. After an RLF of the primary secondary cell occurs at the UE, and the UE transmits SCG failure information to the MN, the MN can transmit the identification of the source PSCell to the source SN. In case the UE context at the source SN is removed in response to a request from the MN, the source SN will be informed about the source PSCell CGI.

FIG. 1 shows an example environment 100 in which example embodiments of the present disclosure can be implemented.

The environment 100, which may be a part of a communication network, comprises a terminal device 110 and three network devices 120, 130 and 140 that can communicate with each other. The network devices 120, 130 and 140 comprises a master network device 120 and two secondary network devices 130 and 140 where the master network device 120 and one of the secondary network devices 130 and 140 are used to provide DC to the terminal device 110. In this example, the terminal device 110 moves from a primary secondary cell (PSCell) 150 provided and operated by the secondary network device 130 to a PSCell 160 provided and operated by the secondary network device 140. For the purpose of discussion, the secondary network devices 130 and 140 will be referred to as a source secondary network device 130 and a target secondary network device 140 respectively, and the PSCells 150 and 160 will be referred to as a source PSCell 150 and a target PSCell 160 respectively.

It is to be understood that one terminal device and three network devices are shown in the environment 100 only for the purpose of illustration, without suggesting any limitation to the scope of the present disclosure. Any suitable numbers of terminal devices and network devices may be included in the environment 100. For example, the environment 100 may comprise more than one terminal device, each operating in DC with the respective master network device of a plurality of master network devices and the respective secondary network device of a plurality of secondary network devices and moving from one of the secondary network devices to another one of the secondary network devices.

The communications between the terminal device 110 and the three network devices 120, 130 and 140 in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

The three network devices 120, 130 and 140 may communicate with each other in a wired or wireless way. For example, these network devices 120, 130 and 140 may communicate with S1/NG, X2/Xn, and/or F1/E1 interfaces.

In various example embodiments, when the terminal device 110 is moving from the source secondary network device 130 to the target secondary network device 140, the source secondary network device 130 indicates an identification of the source PSCell 150 (such as a PSCell CGI) to the master network device 120. After the terminal device 110 is changed from the source secondary network device 130 to the target secondary network device 140, if a RLF occurs in the target PSCell 160, the master network device 120 can transmit the identification of the source PSCell 150 to the source secondary network device 130. In this way, the source secondary network device 130 may be aware of the source PSCell 150 serving the terminal device 110 before in the case that a context of the terminal device 110 (such as UE context) is no longer available at the source secondary network device 130.

Figure 2:
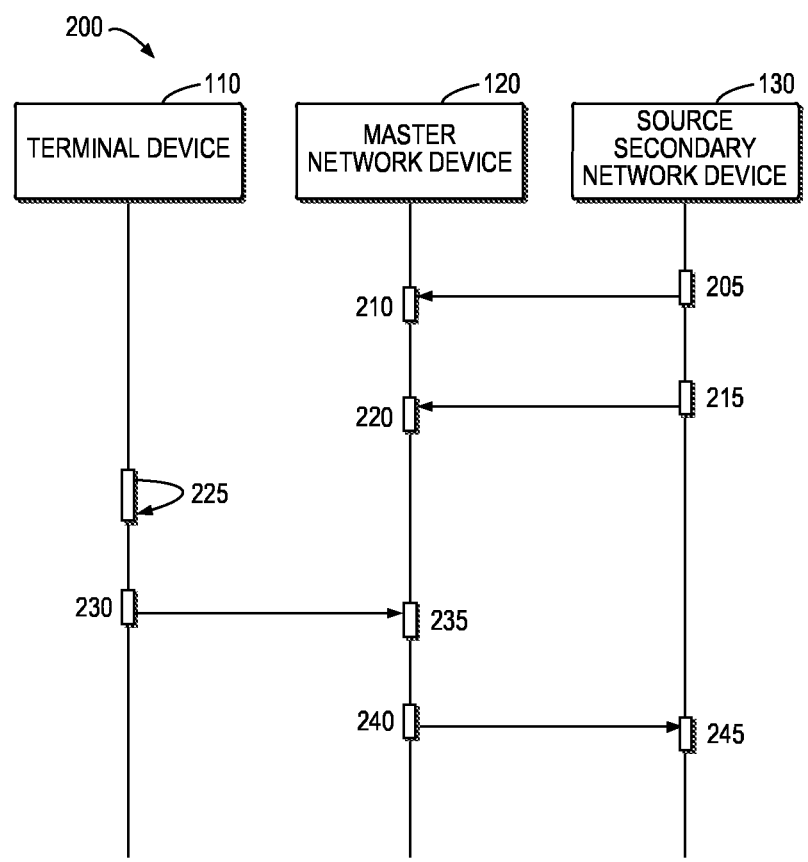
FIG. 2 illustrates an example process of coordinated MRO for a PSCell change failure according to some example embodiments of the present disclosure.

FIG. 2 shows an example process 200 of coordinated MRO for a PSCell change failure according to some example embodiments of the present disclosure.

In the process 200 as shown in FIG. 2, if it is determined that the terminal device 110 is to be changed from the source secondary network device 130 to the target secondary network device 140, the source secondary network device 130 transmits (205) to the master network device 120 a request (referred to as a first request) for a change of the terminal device 110 from the source secondary network device 130 to the target secondary network device 140. The decision of the change may be made by the source secondary network device 130 based on measurements related to the mobility of the terminal device 110 that may be obtained from the terminal device 110, or by itself, or from the target secondary network device 140 or any other network devices. The decision may also be made by the source secondary network device 130 according to any suitable rules including, for example, MRO related configurations that may be set by the source secondary network device 130 or the master network device 120 or by any other network devices.

The first request of the change may be implemented in any suitable form. In some example embodiments, the first request may be an SgNB change required message that is transmitted by the source secondary network device 130 upon the decision of the change.

Then, the master network device 120 receives (210) the first request for the change from the source secondary network device 130. Then, the master network device 120 may know that the terminal device 110 is to be changed from the source secondary network device 130 to the target secondary network device 140.

In addition to the first request for the change, as shown in FIG. 2, the source secondary network device 130 transmits (215) an identification of the source PSCell 150 operated by the source secondary network device 130. The source PSCell 150 serves the terminal device prior to the transmission of the first request from the source secondary network device 130 to the master network device 120. The identification of the source PSCell 150 may be a source PSCell CGI. Thus, the master network device 120 receives (220) the identification of the source PSCell 150 from the source secondary network device 130.

The identification of the source PSCell 150 may be transmitted from the source secondary network device 130 to the master network device 120 in any suitable timing. In some example embodiments, the identification of the source PSCell 150 may be transmitted by the source secondary network device 130 upon the decision of the change, for example, together with the first request of the change. In some example embodiments, a SgNB change required message as an example of the first request may contain the identification of the source PSCell 150. As such, the transmission of the identification of the source PSCell 150 may reuse the existing message and facilitate backward compatibility.

In some example embodiments, the identification of the source PSCell 150 may be transmitted after the completion of the change from the source secondary network device 130 to the target secondary network device 140. For example, the identification of the source PSCell 150 may be transmitted by the source secondary network device 130 after the terminal device 110 is connected to the target secondary network device 140. As such, the identification of the source PSCell 150 may be transmitted only if there is a successful change from the source secondary network device 130 to the target secondary network device 140, thereby reducing the overhead and improving the resource efficiency.

In some example embodiments, the identification of the source PSCell 150 may be transmitted by the source secondary network device 130 after the source secondary network device 130 receives from the master network device 120 a request (referred to as a second request) to release a context of the terminal device 110. For example, the second request may be a UE context release message. The second request from the master network device 120 may be replied by the source secondary network device 130 with the identification of the source PSCell 150. The reply may be implemented using a new message (for example, a class-2 message) that includes the identification of the source PSCell 150. After the transmission of the identification of the source PSCell 150, the source secondary network device 130 may remove the context of the terminal device 110.

In the process 200, after the terminal device 110 is changed from the source secondary network device 130 to the target secondary network device 140, the terminal device 110 determines (225) that an RLF occurs in the target PSCell 160. The terminal device 110 transmits (230) to the master network device 120 an indication of the RLF in the target PSCell 160. The indication of the RLF may be carried in an SCG Failure Information message. In some example embodiments, the RLF failure may occur when the terminal device 110 is still connected to the source PSCell 150. For example, the change from the source secondary network device 130 to the target secondary network device 140 may not be completed for some reasons, for example, due to channel condition changes, UE mobility and the like. In this case, the terminal device 110 may send the indication of the RLF in the source PSCell 150.

Accordingly, the master network device 120 receives (235) the indication of the RLF from the terminal device 110. The master network device 120 transmits (240) the indication of the RLF to the source secondary network device 130, together with the identification of the source PSCell 150 as previously received from the source secondary network device 130 and stored by the master network device 120. The indication of the RLF and the identification of the source PSCell 150 may be carried by an SCG Failure Information message forwarded by the master network device 120 to the source secondary network device 130. For example, the SCG Failure Information message may be added with new information elements (IEs) carrying the source PSCell CGI as an example of the identification of the source PSCell 150.

Then, the source secondary network device 130 receives (245), from the master network device 120, the indication of the RLF and the identification of the source PSCell 150. As such, the source secondary network device 130 can know the cell previously serving the terminal device 110 and make configuration changes for MRO. Lack of source PSCell information from the master network device 120 may be mitigated, paving the way to successful MRO for a SN change failure.

In some example embodiments, the master network device 120 may analyze a cause of the RLF and transmits to the source secondary network device 130 the indication of the RLF along with the identification of the source PSCell 150 if it is determined that the RLF is caused by a too early primary secondary cell change or a primary secondary cell change to a wrong cell.

In some example embodiments, the master network device 120 may maintain a timer to detect the cause of the RLF. The master network device 120 may start the timer when the change from the source secondary network device 130 to the target secondary network device 140 is performed by the terminal device 110. The value of the timer may be set depending on specific implementations. If the terminal device 110 performs a successful change from the source secondary network device 130 to the target secondary network device 140, but then fails in the target PSCell 160 afterwards, the master network device 120 may check whether the timer has already expired. If the timer has not expired, the master network device 120 may consider that a relatively short amount of time has passed since the last PSCell change and may determine that the failure may be caused by a too early PSCell change.

For example, in the case of a too early PSCell change, the source secondary network device 130 has initiated the change from the source secondary network device 130 to the target secondary network device 140. The terminal device 110 has received the command for the change (such as an RRCConnectionReconfiguration message) and initiated the change, for example, from the source PSCell 150 of the source secondary network device 130 to the target PSCell 160 of the target secondary network device 140. There is a situation that the random access procedure made by the terminal device 110 to the target PSCell 160 is successful, however, after a short period of time, the terminal device 110 faces an RLF in the target PSCell 160. In this situation, the terminal device 110 may send the indication of the RLF to the master network device 120, for example, in the SCG Failure Information message that includes a measurement report of the serving and neighboring cells. If the measurements indicate that the source PSCell 150 is the best cell, it means that the source secondary network device 130 had initiated the change too early. Since the change is completed, the context of the terminal device 110 may no longer be available at the source secondary network device 130, the transmission of the identification of the source PSCell 150 from the master network device 120 to the source secondary network device 130 may enable the source secondary network device 130 to be aware of the PSCell previously serving the terminal device 110.

Alternatively or in addition, when the timer has not expired, the master network device 120 may determine that the failure may be caused by a PSCell change to a wrong cell. For example, the terminal device 110 may have initiated the change, from the source PSCell 150 of the source secondary network device 130 to the target PSCell 160 of the target secondary network device 140. The random access procedure made by the terminal device 110 to the target PSCell 160 is successful, but the terminal device 110 faces an RLF in the target PSCell 160 after a short period of time. If the measurements contained in the SCG Failure Information message from the terminal device 110 indicate that the best cell is a cell other than the source PSCell 150, the master network device 120 may determine that the source secondary network device 130 should have initiated a change to a different cell than the target PSCell 160 of the target secondary network device 140. Therefore, the source secondary network device 130 had initiated a PSCell change to a wrong cell. Likewise, since the change is completed, the context of the terminal device 110 may no longer be available at the source secondary network device 130. In this case, the source secondary network device 130 may be aware of the PSCell previously serving the terminal device 110 based on the identification of the source PSCell 150 received from the master network device 120.

If the timer expires, the master network device 120 may determine a case of a too late PSCell change. In this case, too much time has passed since the last PSCell change performed by the terminal device 110. This means that the target secondary network device 140 did not initiate any further PSCell change or initiated a further PSCell change too late, and an RLF occurs in the target PSCell 160. Accordingly, the identification of the source PSCell 150 may not be sent to the source secondary network device 130 to further reduce the signaling overhead.

In some example embodiments, the master network device 120 may keep the identification of the source PSCell 150 for a certain period of time to improve the storage resource efficiency. For example, the master network device 120 may keep the identification of the source PSCell 150 until expiry of the timer to detect the cause of the RLF. As described above, receiving the RLF indication after the expiry of the timer indicates that the target secondary network device 140 did not initiate any further PSCell change or initiated a PSCell change too late. After the timer expires, if the target secondary network device 140 initiates a further PSCell change, the target secondary network device 140 may transmit the identification of the new source PSCell 160 to the master network device 120 again and the master network device 120 may restart the timer. By keeping the identification of the source PSCell until expiry of the timer, the identification of the source PSCell may be transmitted by the master network device 120 to the source secondary network device 130 when needed, and the storage resource efficiency may be improved at the master network device 120.

In some example embodiments, the master network device 120 may keep the identification of the source PSCell 150 until reception of an identification of a new PSCell that is operated by the target secondary network device 140 and serves the terminal device 110 after the first request for the change from the source secondary network device 130 to the target secondary network device 140. Alternatively or in addition, the identification of the source PSCell 150 may be kept until initiation of a further change of the terminal device 110 from the target secondary network device 140 to a further secondary network device.

Figure 3:
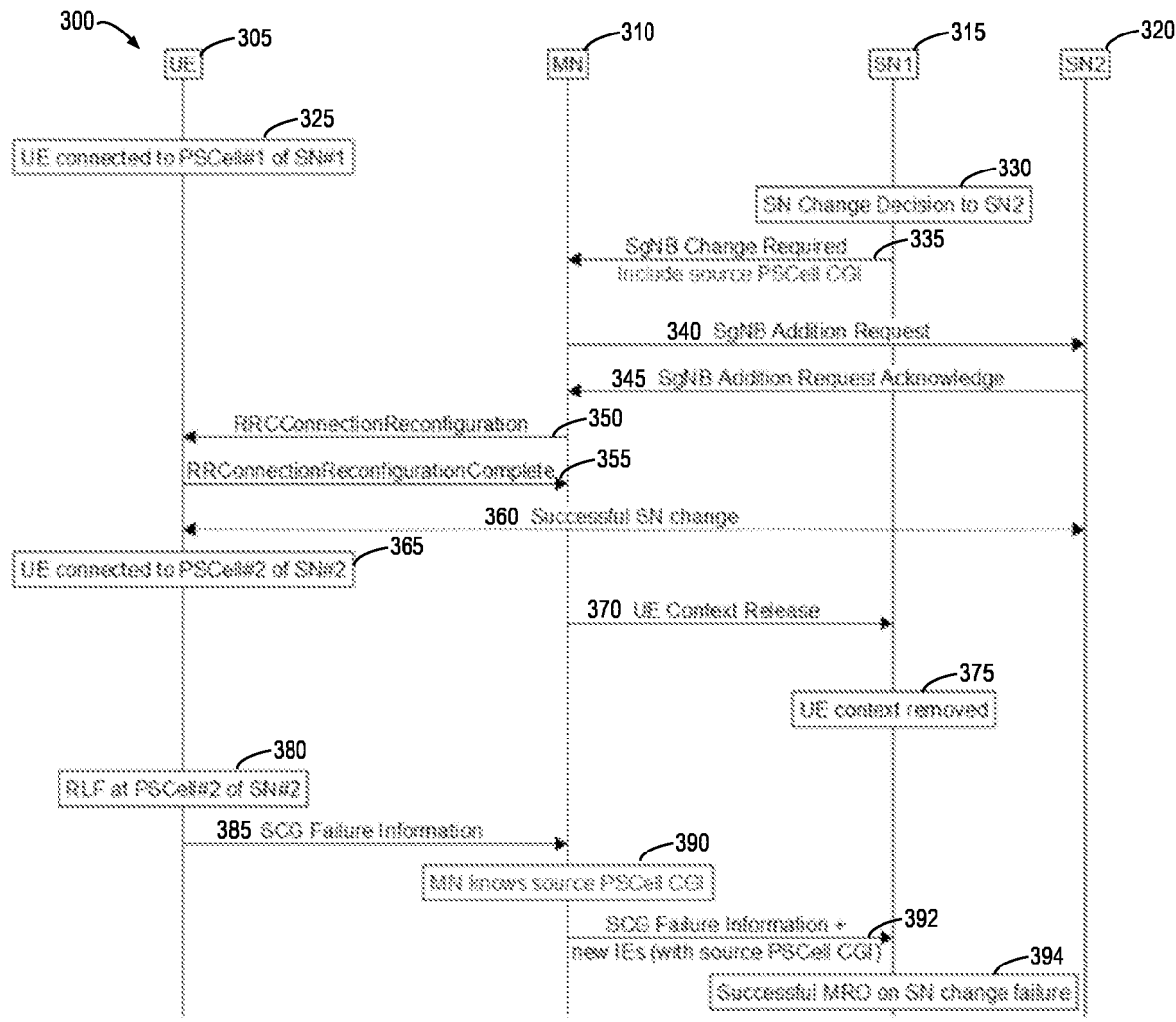
FIG. 3 illustrates an example process of a PSCell change according to some example embodiments of the present disclosure.

FIG. 3 shows an example process 300 of a PSCell change according to some example embodiments of the present disclosure.

In this example, the terminal device 110 is implemented by a UE 305, the master network device 120 is implemented by a master node (MN) 310, the source secondary network device 130 is implemented by a secondary node (SN) 315, labeled as SN1, and the target secondary network device 140 is implemented by a SN 320, labeled as SN2. The source PSCell 150 is implemented by a PSCell of SN1 (labeled as PSCell #1), and the target PSCell 160 is implemented by a PSCell of SN2 (labeled as PSCell #2). The identification of the source PSCell 150 is implemented by a CGI.

As shown in FIG. 3, at 325, the UE 305 is connected to a PSCell #1 of SN1. At 330, the SN 315 makes a SN change decision to the SN 320. At 335, the SN 315 transmits to the MN 310 an SgNB change required message as the first request for the change, which includes a source PSCell CGI. At 340, the MN 310 transmits an SgNB addition request to the SN 320. At 345, the SN 320 transmits a SgNB addition request acknowledge to the MN 310. At 350, the MN 310 transmits an RRCConnectionReconfiguration message to the UE 305. At 355, the UE 305 transmits an RRCConnectionReconfigurationComplete message to the MN 310. At 360, the SN change is successfully performed.

At 365, the UE 305 is connected to PSCell #2 of SN2. At 370, the MN 310 transmits to the SN 315 a UE context release message as the second request to release a context of the terminal device 110. At 375, the SN 315 removes the UE context. At 380, the UE 305 determines an RLF in PSCell #2 of SN #2. At 385, the UE 305 transmits a SCG Failure Information message to the MN 310. At 390, the MN 310 knows the source PSCell CGI. At 392, the MN 310 transmits the SCG Failure Information message including new IEs with the source PSCell CGI to the SN 315. At 394, the SN 315 performs MRO on the SN change failure.

Figure 4:
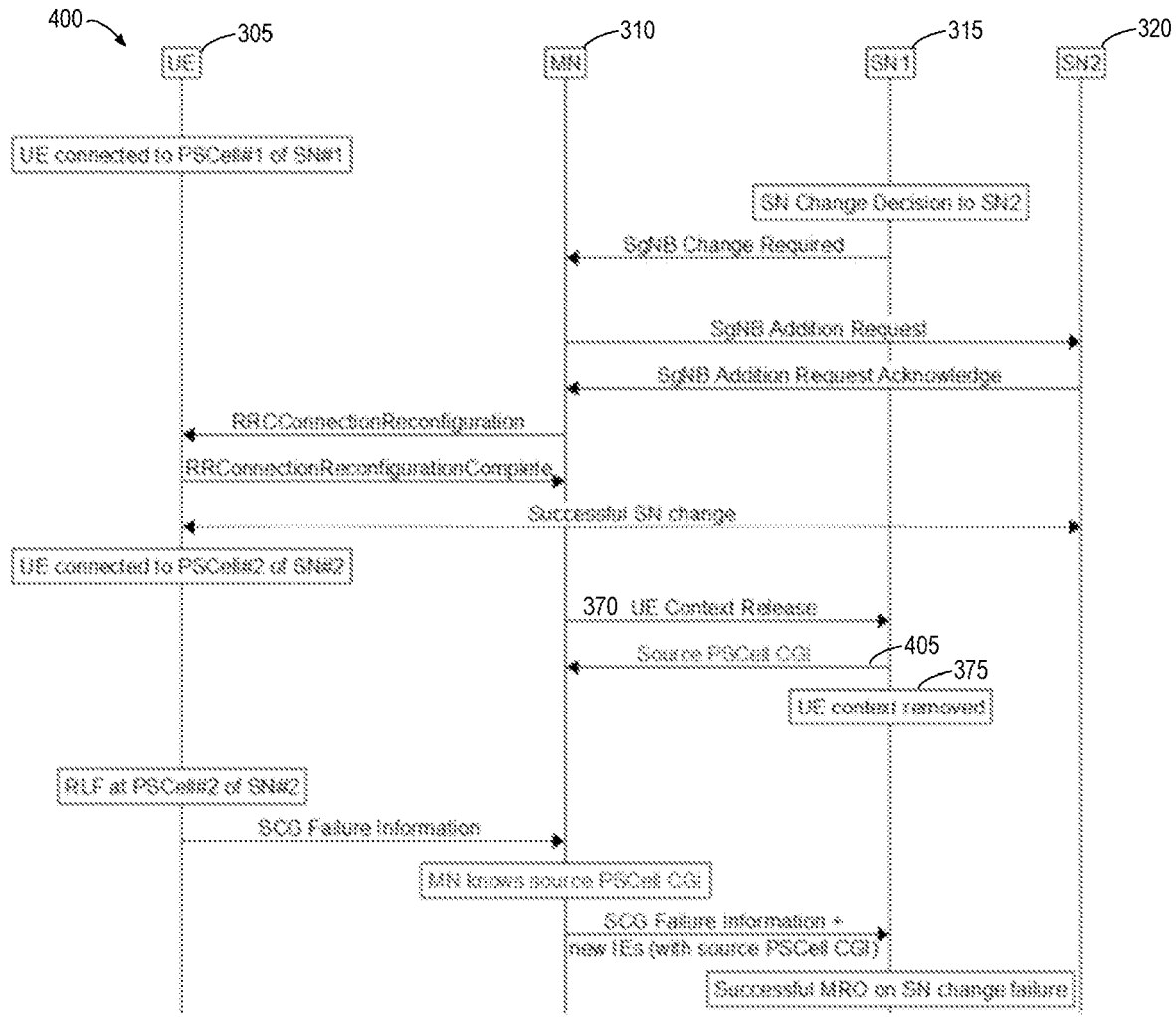
FIG. 4 illustrates another example process of a PSCell change according to some other example embodiments of the present disclosure.

FIG. 4 shows another example process 400 of a PSCell change according to some other example embodiments of the present disclosure.

As shown in FIG. 4, the process 400 is similar to the process 300 in FIG. 3. The difference between the process 400 and the process 300 is that the SN 315 transmits (405) the source PSCell CGI to the MN 310 after the MN 310 transmits (370) the UE Context Release message to the SN 315. Then, at 375, the SN 315 removes the UE context.

Figure 5:
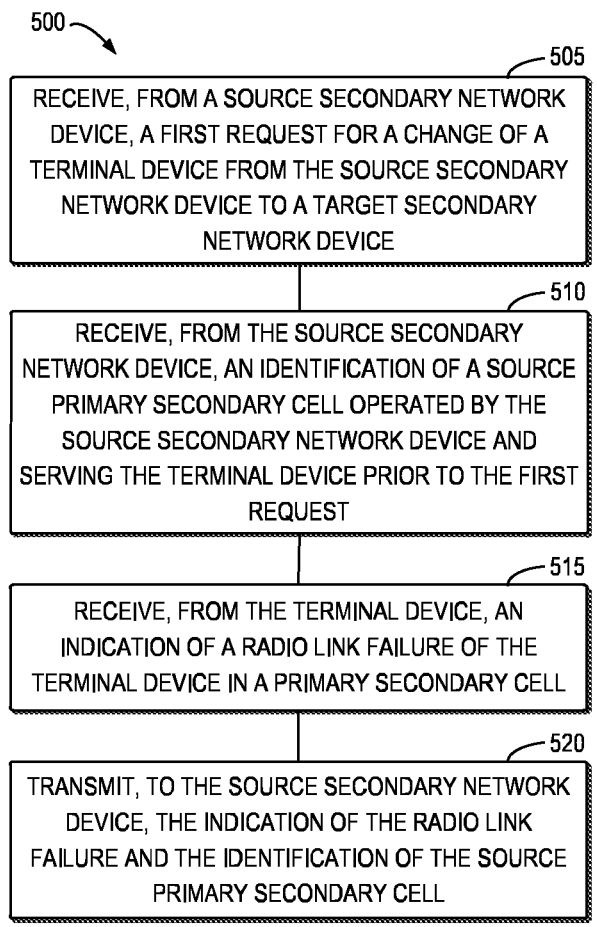
FIG. 5 illustrates an example method for a change from a source secondary network device to a target network device according to some example embodiments of the present disclosure.

FIG. 5 shows an example method 500 for a change from the source secondary network device 130 to the target network device 140 according to some example embodiments of the present disclosure. The method 500 can be implemented at the master network device 120 as shown in FIG. 1. For the purpose of discussion, the method 500 will be discussed below with reference to FIG. 1.

As shown in FIG. 5, at block 505, the master network device 120 receives, from the source secondary network device 130, the first request for the change of the terminal device 110 from the source secondary network device 130 to a target secondary network device 140. At block 510, the master network device 120 receives an identification of the source PSCell 150 from the source secondary network device 130. At block 515, the master network device 120 receives, from the terminal device 110, an indication of an RLF of the terminal device 110 in a PSCell. As discussed above, the PSCell wherein the RLF occurs may be the target PSCell 160 or the source PSCell 150. At block 520, the master network device 120 transmits, to the source secondary network device 130, the indication of the RLF and the identification of the source PSCell 150.

In some example embodiments, the identification of the source PSCell 150 may be comprised by the first request. The first request may be a SgNB change required message from the source secondary network device 130 to the master network device 120.

In some example embodiments, the identification of the source PSCell 150 may be received from the source secondary network device 130 as a response to the transmission of the second request from the master network device 120 to the source secondary network device 130 to release the context of the terminal device 110. The second request may be a UE context release message.

In some example embodiments, the master network device 120 may keep the identification of the source PSCell 150 for a certain period of time. For example, the identification of the source PSCell 150 may be kept at the master network device 120 until expiry of a timer to detect a cause of the RLF, until reception of an identification of a new PSCell operated by the target secondary network device 140 and serving the terminal device 110 after the first request, and/or until initiation of a further change of the terminal device 110 from the target secondary network device 140 to a further secondary network device.

In some example embodiments, the master network device 120 may transmit, to the source secondary network device 130, the indication of the RLF and the identification of the source PSCell if it is determined that the RLF is caused by a too early primary secondary cell change or a primary secondary cell change to a wrong cell.

Figure 6:
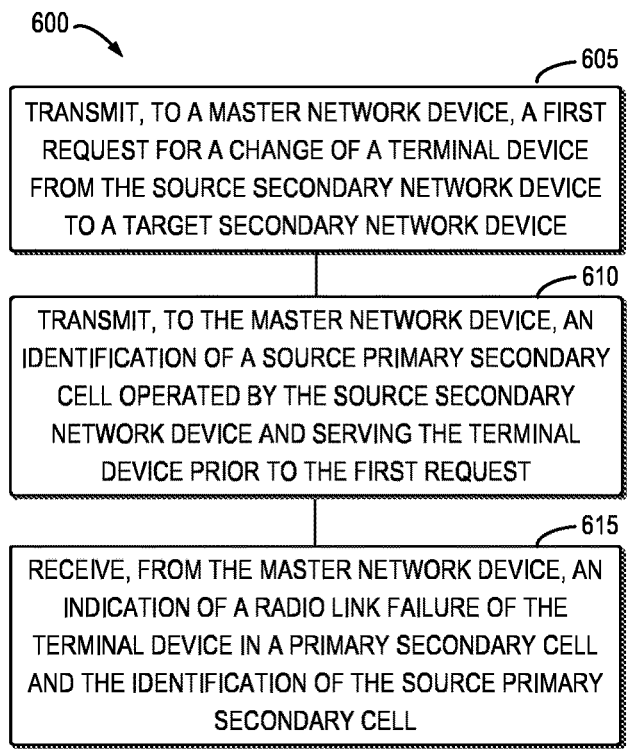
FIG. 6 illustrates an example method for a change from the source secondary network device to the target network device according to some other example embodiments of the present disclosure.

FIG. 6 shows an example method 600 for a change from the source secondary network device 130 to the target network device 140 according to some other example embodiments of the present disclosure. The method 600 can be implemented at the source secondary network device 130 as shown in FIG. 1. For the purpose of discussion, the method 600 will be discussed below with reference to FIG. 1.

As shown in FIG. 6, at block 605, the source secondary network device 130 transmits, to the master network device 120, the first request for the change from the source secondary network device 130 to a target secondary network device 140. At block 610, the source secondary network device 130 transmits, to the master network device 120, the identification of the source PSCell 150. At block 615, the source secondary network device 130 receives, from the master network device 120, an indication of an RLF of the terminal device 110 in a primary secondary cell and the identification of the source PSCell.

In some example embodiments, the identification of the source PSCell 150 may be transmitted by the source secondary network device 130 if it is determined that the terminal device 110 is to be changed from the source secondary network device 130 to the target secondary network device 140. The identification of the source PSCell 150 may be included in the first request that may be a SgNB change required message.

In some example embodiments, the identification of the source PSCell 150 may be transmitted by the source secondary network device 130 after receiving the second request from the master network device 120 to release the context of the terminal device 110. The second request may be a UE context release message. In some example embodiments, upon the transmission of the identification of the source PSCell 150 to the master network device 120, the source secondary network device 130 may remove the context of the terminal device 110 from its storage memory.

All operations and processing as described above with reference to FIGS. 1-4 are likewise applicable to the method 500 and 600 and have similar effects. For the purpose of simplification, the details will be omitted.

Figure 7:
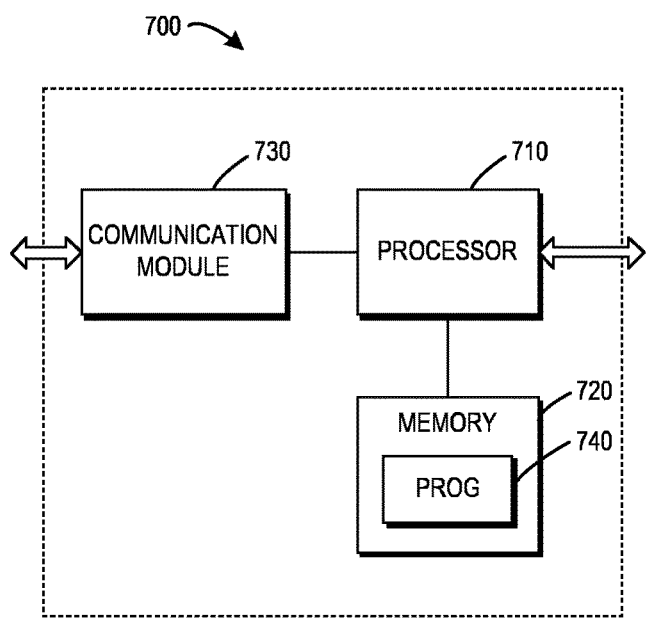
FIG. 7 illustrates a simplified block diagram of a device that is suitable for implementing example embodiments of the present disclosure.

FIG. 7 is a simplified block diagram of a device 700 that is suitable for implementing example embodiments of the present disclosure.

As shown, the device 700 includes a processor 710, a memory 720 coupled to the processor 710, a communication module 730 coupled to the processor 710, and a communication interface (not shown) coupled to the communication module 730. The memory 720 stores at least a program 740. The communication module 730 is for bidirectional communications, for example, via one or more antennas. The communication interface may represent any interface that is necessary for communication.

The program 740 is assumed to include program instructions that, when executed by the associated processor 710, enable the device 700 to operate in accordance with the example embodiments of the present disclosure, as discussed herein with reference to FIGS. 1-6. The example embodiments herein may be implemented by computer software executable by the processor 710 of the device 700, or by hardware, or by a combination of software and hardware. The processor 710 may be configured to implement various example embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

When the device 700 acts as the master network device 120, the processor 710 and the communication module 730 may cooperate to implement the method 500 as described above with reference to FIGS. 1-5. All the operations and features of the master network device 120 as described above with reference to FIGS. 1-5 are likewise applicable to the device 700 and have similar effects. When the device 700 acts as the source secondary network device 130, the processor 710 and the communication module 730 may cooperate to implement the method 600 as described above with reference to FIGS. 1-4 and 6. All the operations and features of the source secondary network device 130 as described above with reference to FIGS. 1-4 and 6 are likewise applicable to the device 700 and have similar effects.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 or 600 as described above with reference to FIGS. 1-6. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A master network device, comprising:
   at least one processor; and
   at least one memory including computer program code;
   the at least one memory and the computer program code configured to, with the at least one processor, cause the master network device to:
   receive, from a source secondary network device, a first request configured to change a terminal device from the source secondary network device to a target secondary network device and comprising an identification of a source primary secondary cell operated by the source secondary network device and lastly serving the terminal device prior to the first request;

receive, from the terminal device, an indication of a radio link failure of the terminal device in a primary secondary cell; and transmit, to the source secondary network device and responsive to the radio link failure detected by the terminal device in the primary secondary cell and reported to the master network device, the indication of the radio link failure, and the identification of the source primary secondary cell as included in the first request received from the source secondary network device and as stored by the master network device.

2. The master network device of claim 1, wherein the first request comprises a SgNB change required message.

3. The master network device of claim 1, wherein the master network device is further caused to:

keep the identification of the source primary secondary cell until at least one of:

expiry of a timer to detect a cause of the radio link failure, reception of an identification of a new primary secondary cell operated by the target secondary network device and serving the terminal device after the first request, or initiation of a further change of the terminal device from the target secondary network device to a further secondary network device.

4. The master network device of claim 1, wherein the master network device is caused to transmit the indication of the radio link failure and the identification of the source primary secondary cell by:

in accordance with a determination that the radio link failure is caused by a too early primary secondary cell change or a primary secondary cell change to a wrong cell, transmitting, to the source secondary network device, the indication of the radio link failure and the identification of the source primary secondary cell.

5. A non-transitory computer readable storage medium comprising program instructions stored thereon, wherein the instructions, when executed by a processor, cause performance of the master network device according to claim 1.

6. A source secondary network device, comprising:

at least one processor; and at least one memory including computer program code;

the at least one memory and the computer program code configured to, with the at least one processor, cause the source secondary network device to:

transmit, to a master network device, a first request configured to change a terminal device from the source secondary network device to a target secondary network device and comprising an identification of a source primary secondary cell operated by the source secondary network device and lastly serving the terminal device prior to the first request; and receive, from the master network device and responsive to a radio link failure detected by the terminal device in a primary secondary cell and reported to the master network device, an indication of the radio link failure of the terminal device in the primary secondary cell, and the identification of the source primary secondary cell as included in the first request transmitted to the master network device.

7. The source secondary network device of claim 6, wherein the source secondary network device is caused to transmit the identification of the source primary secondary cell by:

in response to determining that the terminal device is to be changed from the source secondary network device to the target secondary network device, transmitting the identification of the source cell to the master network device.

8. The source secondary network device of claim 6, wherein the first request comprises a SgNB change required message.

9. A non-transitory computer readable storage medium comprising program instructions stored thereon, wherein the instructions, when executed by a processor, cause performance of the source secondary network device according to claim 6.

10. A method comprising, at a master network device:

receiving, from a source secondary network device, a first request configured to change a terminal device from the source secondary network device to a target secondary network device and comprising an identification of a source primary secondary cell operated by the source secondary network device and lastly serving the terminal device prior to the first request;

receiving, from the terminal device, an indication of a radio link failure of the terminal device in a primary secondary cell; and transmitting, to the source secondary network device and responsive to the radio link failure detected by the terminal device in the primary secondary cell and reported to the master network device, the indication of the radio link failure, and the identification of the source primary secondary cell as included in the first request received from the source secondary network device and as stored by the master network device.

11. A method comprising, at a source secondary network device:

transmitting, to a master network device, a first request configured to change a terminal device from the source secondary network device to a target secondary network device and comprising an identification of a source primary secondary cell operated by the source secondary network device and lastly serving the terminal device prior to the first request; and receiving, from the master network device and responsive to a radio link failure detected by the terminal device in a primary secondary cell and reported to the master network device, an indication of the radio link failure of the terminal device in the primary secondary cell, and the identification of the source primary secondary cell as included in the first request transmitted to the master network device.

\* \* \* \* \*